Dec. 8, 1942.    J. W. TAYLOR    2,304,610
PROCESS OF WASHING RESINS
Filed Dec. 24, 1940
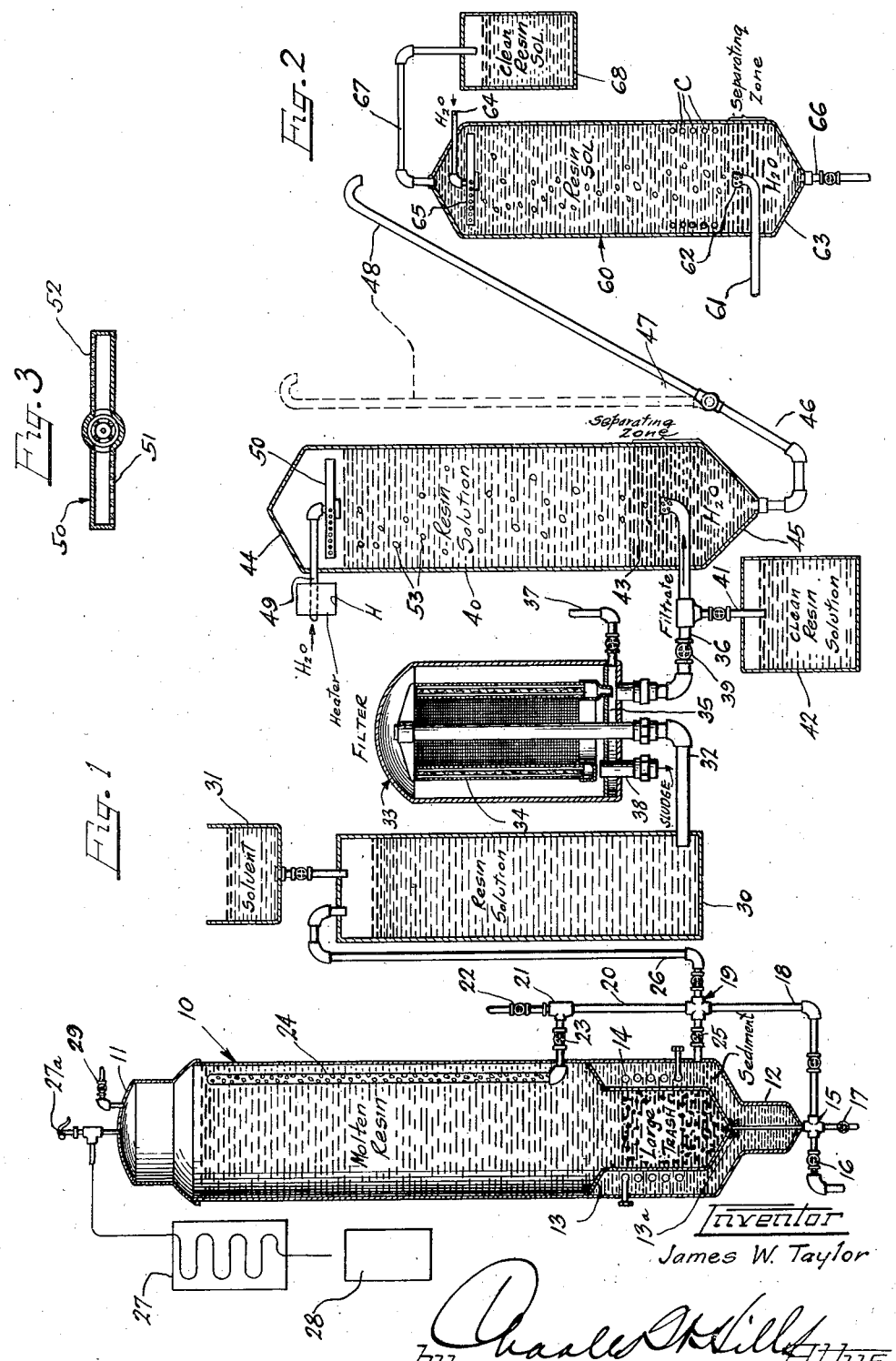
Inventor
James W. Taylor
by Charles H. Hill
Attys.

Patented Dec. 8, 1942

2,304,610

UNITED STATES PATENT OFFICE 2,304,610

PROCESS OF WASHING RESINS

James W. Taylor, Pensacola, Fla., assignor to Peninsular-Lurton Company, Pensacola, Fla., a corporation of Florida Application December 24, 1940, Serial No. 371,573

5 Claims. (Cl. 260—109)

This invention relates to a process of washing resins to remove fine impurities that will ordinarily pass through a filter medium.

More specifically this invention relates to the washing of the gum exudate or crude oleoresin obtained from pine trees and the like to remove impurities having great affinity for the resinous material.

According to this invention the resinous material is dissolved in a solvent, preferably after it has been melted. The solution is then filtered through a barrier capable of retaining solid occluded impurities but coarse enough to pass the solution. The resinous solution is diluted either before or after the filtering operation to a specific gravity less than that of water. A deep pool of the diluted solution is formed and water is evenly distributed, in fine droplet form, over the entire surface of the solution. The water droplets pass down through the solution gathering the remaining occluded or colloidal impurity particles which have an affinity for water, or which are heavier than the resin solution. The water drops carry these impurities to the bottom of the pool. A pond of water containing the impurities is thus formed in the bottom of the pool and is removed at the same rate as the water droplets are introduced over the surface of the pool. In this manner a continuous flow of clean water is passed through the resin solution and all of the impurities can be extracted. Since the resin solution has a specific gravity less than the gravity of water, the water will pass through the solution.

Alteratively, a difference in specific gravity between the washing medium and the resin solution can be obtained by using brines such as salt water solutions as the cleaning medium. However, fresh water is preferred, inasmuch as it is the least expensive and can be discarded after use.

Oleoresins, as taken from the collecting cup on a living pine tree, have an affinity for about 1 to 5% of water, thereby producing a relatively stable primary emulsion. The emulsification is effected during the 10 to 30 days that the crude oleoresin is collecting in the cup.

If the emulsion is heated to boiling temperatures it is completely broken or if an oleoresin solvent is added to the primary emulsion until the gravity is less than 1, the emulsion is broken. The water in the primary emulsion contains many dissolved impurities and if the primary emulsion is not broken before distillation of the oleoresin, these dissolved impurities are precipitated by heat as fine solids which remain in the resulting gum rosin.

Since the crude exudate collected from the living pine trees is a primary stable emulsion of oleoresin, water and impurities plus trash such as pine needles, sand, and the like, the exudate is preferably treated in accordance with the process disclosed and claimed in my Patent No. 2,218,-365 dated October 15, 1940, entitled: "Process of cleaning resins" prior to the formation of the oleoresin solution through which the water droplets are passed in accordance with the instant invention. It should be understood, however, that an oleoresin solution could be made directly from the crude exudate, and that the solvent would break up the primary emulsion when the solution was diluted to yield a specific gravity less than the gravity of water.

It is, then, an object of this invention to provide a process for rapidly washing resins to remove colloidal and other fine solid impurities therefrom.

Another object of this invention is to provide a process for rapidly washing resins to remove colloidal and other fine solid impurities therefrom.

Another object of this invention is to provide a process for rapidly washing oleoresin solutions to extract colloidal and occluded fine impurities therefrom.

A further object of this invention is to pass droplets of a washing material through a resin solution for extracting impurities from the solution.

A specific object of this invention is to remove occluded fine impurities from oleoresins by forming a solution of the resin in a solvent and by passing through the solution an extracting fluid having a gravity greater than the solution.

Another specific object of the invention is to extract fine occluded solids from crude oleoresinous primary emulsions by melting the resins to break up the emulsion, dissolving the molten resin in a solvent such as turpentine or solvent naphtha to produce a solution having a specific gravity less than 1, filtering the coarser solids from the solution, and passing clean water, in fine droplet form, through the solution to extract the remaining fine solids.

Other and further objects of the invention will be apparent from the following specification including the attached drawing which illustrates suitable apparatus for carrying out the process of this invention.

On the drawing:

Figure 1 is a diagrammatic view illustrating apparatus for carrying out the process of this invention.

Figure 2 is a diagrammatic view of a form of apparatus suitable for carrying out a continuous washing process according to a modified embodiment of the invention.

Figure 3 is a cross-sectional view of a rotary water sprinkler useful in the apparatus illustrated in Figures 1 and 2.

As shown on the drawing:

The crude oleoresin or primary emulsion obtained from the collecting cups hung on scarified living pine trees to receive the gum exudate from the trees can, according to this invention, either be directly dissolved in a solvent for the oleoresin or can be first melted and then dissolved. Suitable solvents are spirit turpentine, solvent naphtha having a boiling point not less than 200° F. and not greater than 300° F., and the like oleoresin solvents. The solution to be washed preferably contains from 35 to 50% by weight of the solvent based on the total weight of the solution. The solution is diluted until it has a specific gravity less than the specific gravity of the washing fluid to be used. The specific gravity difference between the resinous solution and the washing fluid should not be less than .02 because of the slow settling rate of the fluid through the solution and not greater than .15, because of the cost of removing the solvent from the rosin.

Oleoresin, as taken from the collecting cups on living pine trees and containing a small amount of water forming a primary emulsion together with occluded impurities and trash, can, according to this invention, be dumped into a heating tank or digester 10 shown on the drawing by removing the detachable cover 11 of the tank. The tank 10 has a sump bottom 12 and a perforate basket 13 is suspended in the tank above the sump bottom 12. The solid oleoresin is supported on this basket. Steam coils 14 surround the basket.

The sump 12 receives a cross-connection 15 with one side thereof carrying a valved drain outlet 16 and with a valved steam jet pipe 17 extending vertically therethrough into the sump 12 and having the free end thereof disposed in an inverted funnel portion 13a in the bottom of the basket 13. The other side branch of the cross-connection 15 receives a valved pipe 18 having the upper end thereof connected to another cross-connection 19. The top leg of the cross-connection 19 receives a pipe 20 which is joined with a T 21. The top leg of the T 21 receives a valved steam pipe 22 while the horizontal leg of the T 21 receives a valved pipe 23 entering the tank 10 and communicating with a vertical strainer pipe 24 disposed in the tank above the basket 13.

One horizontal leg of the cross-connection 19 receives a valved pipe 25 entering the tank at the bottom thereof above the sump portion 12. The other horizontal leg of the cross-connection 19 receives a valved discharge pipe 26.

A condenser 27 has the coil thereof connected with the top of the tank 10 for condensing vapors removed from the tank during the heating operation. A safety valve 27a can be incorporated in the condenser tube to hold any desired pressure in the tank. Condensate from the tube is collected in a container 28.

A valved steam inlet 29 is also connected with the top of the tank through the cover 11.

In operation the steam coils 14 initially melt a portion of the oleoresin contained in the basket 13 and as soon as the sump 12 is filled with molten oleoresin, steam is admitted to the jet 17 to effect a recirculation of the melted portion through the contents of the basket. The force of the steam jet draws the melted resin materially upwardly through the funnel 13a into the basket.

Steam is also admitted through the inlet 22, the valves in pipe-lines 23 and 25 being open, while the valves in pipe-lines 18 and 26 are closed. The jet action of the steam entering the T 21 draws molten oleoresin through the strainer pipe 24 and circulates it into the bottom of the tank 10 through the pipe 25. The heated mixture of steam and oleoresin flows upwardly about the steam coil 14 into the top of the heating tank and aids in the melting of the unmelted portion of the resin. The cycle is repeated until the entire charge is melted.

During the introduction of direct steam into the charge in the tank 10 the safety valve 27a is either set to relieve continuously or is manipulated by the operator to vent the tank as required by the demands of the system. During the initial stage of the heating operation a large portion of the steam injected into the charge tends to form an emulsion with the oleoresin. As the heat liberated from the steam tends to gradually raise the temperature of the mass, more and more of the steam is vented through the valve 27a and this steam carries vapors of spirits of turpentine which are condensed in the condenser 27 for future recovery distillation.

When the temperature of the mass reaches about 160° F. the water and oleoresins begin to separate and the mass becomes thinner until a temperature between 180 and 200° F. is reached, at which temperature the mass is in a highly melted state and the water which theretofore formed a thick emulsion at the lower temperatures does not interfere with the filtration of the mass. Heavy sediment is allowed to settle out into the sump 12, the valves in pipes 17, 18, 22 and 23 are closed, and the valves in pipes 25 and 26 are opened. Steam is then admitted through the pipe 29 to force the liquid melt out of the tank through the pipe 26 into the tank 30.

A solvent, such as spirits of turpentine or solvent naphtha, is then introduced into the tank 30 from a storage tank 31 to dissolve the molten resin. The primary emulsion of resin and water has been broken by the heat treatment and the addition of the solvent in the tank does not effect a re-emulsification of the resin even though the same is cooled below the boiling point of water. Sufficient solvent is added to the resin in the tank 30 to produce a solution having a specific gravity less than 1.

The solution is then forced through a pipe 32 into a filter tank 33 having a plurality of annular filtering media such as 34 surrounding the pipe 32. The filtering media are sufficiently fine to remove a large number of solid impurities in the solution but must necessarily be coarse enough to permit passage of the finer solids and colloidal ingredients in the solution. The use of a filter sufficiently fine to retain these colloidal and fine solids would be impractical because the filter media would rapidly clog.

The filtered material is collected from the annular filter 34 into a false bottom 35 of the unit and the filtered solution is then forced through a valved pipe line 36 into the washing tank 40. After the filtering operation the filter cake can be removed as a sludge by introducing steam through a pipe 37 which will blow the filter cake off of the filter media and form a sludge which can be drained through a drain line 38.

The pipe 36 has a valve 39 therein and a valved branch pipe 41 communicating with a tank 42 for a purpose to be described. The pipe 36 enters the tank 40 near the bottom thereof and has a perforated head 43 on the end thereof, in the axial center of the tank. The tank 40 is preferably a tall cylinder about ten or twelve feet in height with a cone top 44 and a cone bottom 45. The head 43 is just above the cone bottom 45.

The bottom end of the cone 45 receives a fixed pipe 46 which extends upwardly along the side of the tank to the top of the cone and terminates in a swing joint 47 carrying a swingable leg 48 which can be moved from a vertical position wherein its open top end is level with the top of the cone 44 to a horizontal position wherein its open end is level with the top of the cone 45. This pipe 48 thus controls the level of material in the tank 40 and the level can be readily adjusted by moving the pipe between vertical and horizontal positions.

Water is introduced in the top of the tank 40 through a pipe 49 terminating in a revolvable spray head 50 disposed over the solution in the tank. As shown in Figure 3, the spray head 50 has perforations 51 facing in one direction on one side of the center thereof and other perforations 52 facing in the other direction on the other side of the center point. Therefore the introduction of water under pressure will cause a rotation of the head 50.

The resin solution in the tank 40 is maintained at a level just below the spray head 50 by tilting the pipe 48 to the position shown in solid lines so that the free end thereof is just below the level of the spray head. Water is then introduced into the pipe 49 and sprayed out of the perforations 51 over the entire top surface of the solution. Water droplets 53, being heavier than the solution, will pass by gravity through the entire body of the solution and the water will separate out from the solution as indicated in the drawing at the separating zone. Water is then collected in the cone 45 and drained through the pipes 46 and 48.

As the water droplets settle through the resinous solution, they extract the impurities from the solution and the impure water is constantly removed from the tank at the same rate that the pure water is introduced. This causes the working of a continuous motion of clean water through the solution and the washing is continued until all the impurities are extracted from the resinous solution. Testing for uniformity may be made by comparing a sample of water taken from the bottom of the tank 40 with a sample of pure water entering the top of the tank. Since the amount of water-soluble impurities in the oleoresin varies greatly, the required amount of wash water will also vary greatly. Relatively clean oleoresin solutions can have the impurities therein removed with about one gallon of water to ten gallons of resin solution, while the dirtier resin solutions may require as much as ten gallons of water for one gallon of resin solution. The washing process is quite rapid and a large tank of resin solution can be washed in from thirty to ninety minutes.

The washing process of this invention will remove impurities which cannot be removed by gravity settling, since these impurities have an affinity for water, about the same gravity as the oleoresinous solution, and will not settle even on long standing. Attempts to remove these impurities by agitation with water followed by settling are not satisfactory and uniform results cannot be obtained with the agitation treatment.

In the agitation treatment, after the agitation the water must settle out of the solution and no two portions of the solution would be subjected to the same treatment, since the bottom of the pond would be the only portion which would be thoroughly washed by all of the solution, while the top part of the pond would be hardly washed at all.

When the water leaving the pipe 48 is as pure as the water entering the pipe 49, the resin solution in the tank 40 can be removed through the same pipe 36 by which it entered. For this purpose the valve 39 in the pipe 36 is closed and the valve branch 41 is opened. The solution will then flow through the pipes 36 and 41 into the collecting tank 42.

If a continuous washing process is desired, the same can be accomplished in accordance with this invention as shown in Figure 2. As therein shown, melted, filtered, and diluted oleoresin solution having a specific gravity less than 1 is continually forced into a tank 60 through an inlet pipe 61 having a perforated head 62 disposed at a level just above the bottom cone 63 of the tank. Wash water is continually introduced into the top of the tank through a pipe 64 and is sprayed from a rotatable spray head 65 similar to the spray head 50 described hereinabove. The water is continuously distributed through the resin solution at a level near the top of the tank and settles through the solution picking up the impurities. The water then separates out of the solution as indicated at the separating zone and is collected in the bottom cone where it is continually removed through an outlet 66. The resin solution is continually introduced through the pipe 61 and the cleaned solution flows out of the top of the tank through an outlet pipe 67 communicating with a storage tank 68. In the continuous process illustrated in Figure 2, the resin solution continually flows upwardly through the tank 61 while the washing water continually flows downwardly through the tank. The countercurrent flow of the liquid yields an efficient washing process.

During the washing process according to this invention, the resin solution is preferably maintained in a heated condition. Temperatures of about 150° F. up to the boiling point of the washing liquid and below the boiling point of the resin solution are satisfactory. If water is used under atmospheric pressure conditions as the washing liquid, temperatures of about 150 to 210° F. are preferred. For example, if the solution has a specific gravity of about .02 less than the specific gravity of the washing fluid, the solution should be maintained at the higher temperatures within the range or around 200° F. If the solution is more dilute and has a specific gravity about .15 less than the specific gravity of the washing fluid, the temperature of the solution can be lower, but the solution should be maintained at not less than 150° F.

To maintain these temperatures, the water introduced into the washing tank can be heated as in a heater H (Fig. 1), or the pond in the tank can be heated by heating coils C (Fig. 2), or both the wash water and pond can be heated. In actual plant practice the solution made from the molten resin is hot and the wash water is obtained from still condensers and is therefore heated above 150° F.

In view of the above descriptions it should now be understood that this invention provides a process for washing resinous materials such as oleoresins by placing these resins in solution in a suitable hydrocarbon, by diluting the solution to a specific gravity less than the gravity of a washing fluid, and by passing the washing fluid preferably in droplet form through the solution while the solution is maintained at elevated temperatures.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. The process of washing crude pine oleoresins which comprises melting the oleoresins to break up the primary emulsion therein, separating trash from the molten resin, forming a solution of the resin in a hydrocarbon solvent, diluting the solution to a specific gravity of from .85 to .98, forming a deep pool of the diluted solution, passing water in fine droplet form downwardly through the solution to extract impurities from the resin, and maintaining the solution at temperatures of about 150 to 210° F. during the extracting operation.

2. The method of cleaning crude exudate obtainable from living pine trees which comprises melting the exudate to break up the primary emulsion therein, settling out heavy impurities from the molten mass, dissolving the molten mass in a hydrocarbon solvent to produce a resinous solution containing about 35 to 50% by weight of solvent, filtering the solution to remove occluded solids, forming a deep pool of the filtered solution, and passing clean hot water in droplet form through the pool to extract the remaining impurities in the solution.

3. The process of washing a melted, filtered and diluted solution of a pine oleoresin in a water-immiscible solvent, said solution having a specific gravity less than water which comprises forming a deep pool of the solution, continually passing water downwardly through the pool in fine droplet form until the water leaving the pool has substantially the same purity as the water entering the pool, and maintaining the pool at temperatures not lower than about 150° F.

4. The method of cleaning crude oleoresinous exudate obtainable from living pine trees which comprises melting the exudate to break up the primary water emulsion therein, allowing the molten mass to stand for settling out heavy solids and trash, diluting the molten mass with a hydrocarbon solvent to produce a solution having a specific gravity less than 1, flowing water in fine droplet form through the diluted solution to extract impurities remaining therein, separating the water from the solution, and maintaining the solution during the water treatment at temperatures between about 150° F. and the boiling point of the water but below the boiling point of the solution.

5. The method of washing an oleoresin soluble in hydrocarbons which comprises dissolving the resin in a hydrocarbon solvent, diluting the solution to a specific gravity less than 1, removing solid impurities, forming a deep pool of the diluted solution, passing clean water in fine droplet form downwardly through the pool to extract impurities from the resin, and maintaining the solution at temperatures of about 150° F. during the extracting operation.

JAMES W. TAYLOR.